US009158296B2

(12) United States Patent
Tran et al.

(10) Patent No.: US 9,158,296 B2
(45) Date of Patent: Oct. 13, 2015

(54) MODELING PROFILE RESPONSE FROM BUMPING MULTIPLE CONSECUTIVE PROFILING ACTUATORS

(71) Applicant: ABB Inc., Wickliffe, OH (US)

(72) Inventors: Peter Quang Tran, Dublin, OH (US); Gary Fulton Morris, Frostburg, MD (US)

(73) Assignee: ABB Inc., Wickliffe, OH (US)

( * ) Notice: Subject to any disclaimer, the term of this patent is extended or adjusted under 35 U.S.C. 154(b) by 432 days.

(21) Appl. No.: 13/655,864

(22) Filed: Oct. 19, 2012

(65) Prior Publication Data

US 2014/0114460 A1    Apr. 24, 2014

(51) Int. Cl.
| | |
|---|---|
| G11B 5/09 | (2006.01) |
| G11B 5/55 | (2006.01) |
| G11B 5/584 | (2006.01) |
| G01N 21/84 | (2006.01) |
| G05B 17/02 | (2006.01) |

(52) U.S. Cl.
CPC ..................... *G05B 17/02* (2013.01)

(58) Field of Classification Search
CPC ......... G06F 19/00; G06F 17/10; G06F 15/46; G05B 13/02; G05B 13/04; G05B 17/01; G05B 17/10; G06G 7/48; G06G 7/64; G06G 7/66; G11B 5/596; D21F 11/00; D21F 11/06; D21F 7/06
USPC ............... 700/129, 30, 31, 38, 122, 127, 128; 703/2, 6; 162/198; 356/429, 431
See application file for complete search history.

(56) References Cited

U.S. PATENT DOCUMENTS

| | | | |
|---|---|---|---|
| 5,539,634 A * | 7/1996 | He ................................. 700/38 |
| 5,602,689 A * | 2/1997 | Kadlec et al. .............. 360/78.04 |
| 5,893,055 A | 4/1999 | Chen |
| 6,086,237 A | 7/2000 | Gorinevsky et al. |
| 6,233,495 B1 | 5/2001 | Chen |
| 2004/0167657 A1 * | 8/2004 | Sasaki .......................... 700/127 |
| 2007/0039705 A1 * | 2/2007 | Stewart ........................ 162/198 |
| 2010/0174512 A1 * | 7/2010 | Berggren et al. ................. 703/2 |

* cited by examiner

*Primary Examiner* — Mohammad Ali
*Assistant Examiner* — MD Azad
(74) *Attorney, Agent, or Firm* — Driggs, Hogg, Daugherty & Del Zoppo Co., LPA; Patrick Daugherty

(57) ABSTRACT

A cross-direction feedback controller, profiler system and actuator setpoint controller are provided in communication with a plurality of actuators in a machine of a web-forming process, and with a local region detector that determines an actual profile response of a product of the web-forming process in response to consecutively bumping each of the actuators. A relationship between generated profile response data and an actuator setpoint change in the generated profile response data is represent by a profile-to-actuator general interaction matrix, which is expanded into linear equations that describe impacts of bumped actuators on different profile points of generated profile response data. The linear equations are rearranged into a bump-magnitude matrix as a function of a desired response model vector. A least-square solution is found for the bump-magnitude matrix, convolved with a window function and then optimized to minimize error between an actual and a modeled profile response.

15 Claims, 10 Drawing Sheets

MODELING PROFILE RESPONSE FROM BUMPING MULTIPLE CONSECUTIVE PROFILING ACTUATORS

TECHNICAL FIELD OF THE INVENTION

The following generally relates to producing rolls of material in an industrial process, and more particularly to the control of process machines to produce a roll of material to include desired physical features.

BACKGROUND

Industrial processes are known for making rolls of end-product material from raw material inputs. For example, paper machines may produce a continuous web of paper from a pulp stock in a "web-forming" process, wherein wood or other material pulp is strained through a moving screen made of fine mesh in order to create a fibrous web which is further processed to produce paper. Web-forming properties such as weight, moisture, thickness, smoothness, etc., are defined, monitored and controlled in the manufacturing process with respect to a variety of different orientations and perspectives, including machine direction (MD) and cross-direction (CD) perspectives which consider such properties along and across the direction of the paper web motion, respectively.

CD control is generally used to maintain certain specified profiles of the paper properties across the web and performed using CD actuators. Such profiles may be measured (for example, by high-resolution scanners installed on machines within the process) and used by a CD control system for feedback in controlling the CD actuators. CD actuators may comprise sets of actuators distributed (for example, uniformly) across a paper sheet. For model based CD control processes, knowing the response relationship between a profile measurement and the movement of a single actuator is important for tuning a control loop.

BRIEF SUMMARY

In one embodiment of the present invention, a method for modeling the response of a multiple consecutive actuator bump test includes generating profile response data by consecutively bumping each of a plurality of actuators in a machine of a web-forming process. A relationship between a profile response in the generated profile response data and an actuator setpoint change in the generated profile response data is represented by a profile-to-actuator general interaction matrix, which is expanded into a plurality of linear equations that each describe an impact of the bumped actuators on each of different respective profile points of the generated profile response data. The linear equations are rearranged into a bump-magnitude matrix as a function of a desired response model vector. A least-square solution is found for the bump-magnitude matrix, convolved with a window function and then optimized to minimize an error between an actual profile response and a modeled profile response.

In another embodiment, a system has a cross-direction feedback controller in communication with a cross-direction profiler system and an actuator setpoint controller. The cross-direction feedback controller and the actuator setpoint controller are each in communication with a plurality of actuators in a machine of a web-forming process, and with a local region detector that determines an actual profile response of a product of the web-forming process in response to consecutively bumping each of the plurality of actuators. The cross-direction feedback controller provides feedback control that causes the cross-direction actuator to adjust the plurality of actuators to maintain the actual profile response of a product of the web-forming process within a specified profile property. This is achieved by representing a relationship between a profile response in the generated profile response data and an actuator setpoint change in the generated profile response data by a profile-to-actuator general interaction matrix, which is expanded into a plurality of linear equations that each describe an impact of the bumped actuators on each of different respective profile points of the generated profile response data. The linear equations are rearranged into a bump-magnitude matrix as a function of a desired response model vector. A least-square solution is found for the bump-magnitude matrix, convolved with a window function and then optimized to minimize an error between an actual profile response and a modeled profile response.

In another embodiment, an article of manufacture has a tangible computer-readable storage medium with computer readable program code embodied therewith, the computer readable program code comprising instructions that, when executed by a computer processing unit, cause the computer processing unit to represent a relationship between a profile response in the generated profile response data and an actuator setpoint change in the generated profile response data by a profile-to-actuator general interaction matrix, which is expanded into a plurality of linear equations that each describe an impact of the bumped actuators on each of different respective profile points of the generated profile response data. The linear equations are rearranged into a bump-magnitude matrix as a function of a desired response model vector. A least-square solution is found for the bump-magnitude matrix, convolved with a window function and then optimized to minimize an error between an actual profile response and a modeled profile response.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 10 is a graphical illustration of a bump magnitude matrix defined by embodiments of the present invention.

FIG. 11 is a graphical illustration of a fully ranked bump magnitude matrix defined by embodiments of the present invention.

Figure 1:
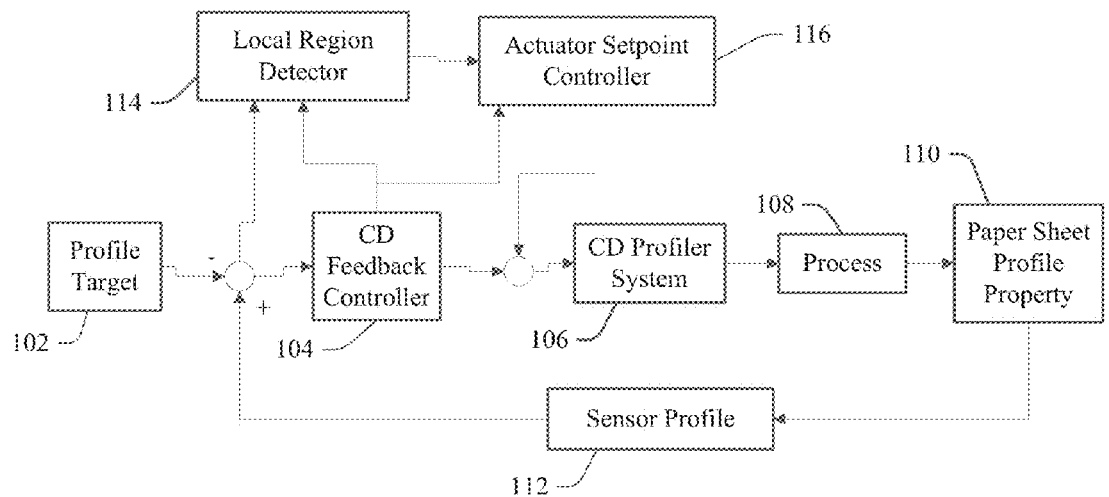
FIG. 1 is a block diagram illustration of a system or process that manipulates setpoints of localized zone actuators of within a paper process system.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

With respect to paper material production processes, CD control is generally used to maintain certain specified profiles of paper properties across a formed web by manipulating a variety of profiling CD actuator systems through an automated control system. FIG. 1 provides an illustration of one embodiment of the present invention wherein a Local Region Detector 114 and an Actuator Setpoint Controller 116 are combined to manipulate the final setpoints of localized zone actuators of a paper process system 108 via a CD profiler system 106, to thereby generate paper having one or more resultant paper sheet profile properties 110 defined by a profile target input 102. The resultant paper sheet profile properties 110 are used as a function of paper product sensor profiles 112 to provide for feedback control via a CD Feedback Controller 104 to adjust CD actuators of the process 108 as a function of one or more of the measurable paper sheet profile properties 110 (for example, weight, moisture, caliper profiles, etc.).

Figure 2:
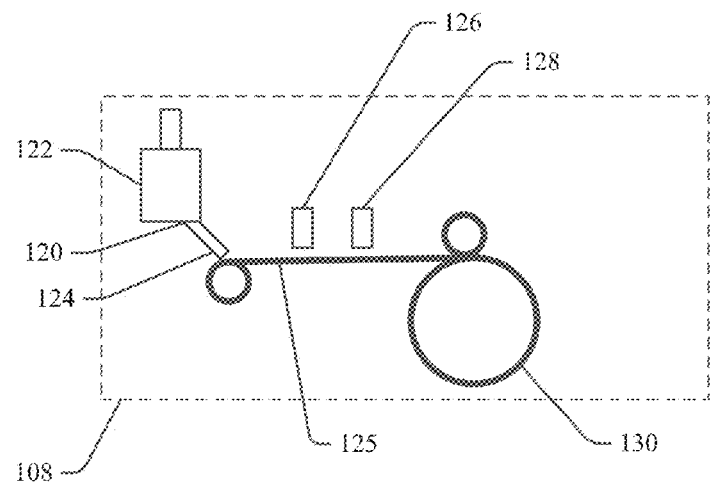
FIG. 2 is a block diagram illustration of exemplary components and actuators of the paper process machinery system of FIG. 1.

More particularly, FIG. 2 illustrates some exemplary components and actuators of the paper process system 108 of FIG. 1. A headbox 122 comprises slurry of wood pulp and/or other constituent fibers products in a liquid solution, which is compelled out of the headbox 122 through a generally rectangular opening known as a slice 120 and onto a moving fabric loop or wire mesh 125 to form a web or paper material. The slice 120 area may comprise a variety of actuators 124 that control the weight or other profile properties of the formed web, for example deformable slice lips, coating blades and dilution flow valves. Moisture profile control may be achieved by regulating water or steam valve actuators 126, or energy output from an infrared source 128. For caliper profile control, actuators may regulate the amount of inductive heating or thermal heating on a calendar roll 130. These are illustrative but not exhaustive examples of process 108 CD actuators that may be controlled by the CD Feedback Controller 104, and still others will be apparent to one skilled in the art.

Performance of model-based CD control according to the system of FIG. 1 is reliant on accurate modeling of the profile response to changes applied to a CD actuator setpoint. The profile response model describes the steady-state change between the controlled profile measurement and stimulus applied to the actuator setpoint, and is analogous to a process response gain, with the exception that the profile response model is generally presented as an array of numbers in order to describe the spatial and magnitude relationship that the profile response has with the setpoint change at a singular actuator zone.

For model based CD control processes, knowing the response relationship between a profile measurement and the movement of a single actuator is important for tuning a control loop. This relationship is considered as a process response to an actuator, and generally referred to as a CD process response gain vector/array for representing the spatial and magnitude components of the response model. The spatial component defines how wide spread the actuator coupling effective is at neighboring actuator zones, and the magnitude component may be presented mathematically as the ratio of the average process change at the bumped actuator to the change in the bumped actuator setpoint and the average process change at the neighboring actuator zones to the change in the bumped actuator setpoint. For CD control performance capability determination, knowing the width of the profile response shape is also important for determining the control cut-off frequency of the control and actuator system.

CD control process response gain may be generally determined by bumping isolated actuators across the web by a significant magnitude, while the control is either suspended or turned off to prevent the feedback control from moving any of the actuator setpoints, to induce changes in the controlled profile measurement. This type of actuator bumping procedure is called an "open-loop bump test" because the control is not actively updating the actuator setpoints to correct a feedback profile measurement. Isolated CD actuators are generally bumped to avoid overlapping of the profile measurement response from the different bumped actuators, which results in a simple system of linear equations that can be solved by the elimination and back substitution method. For example, a CD process response gain vector can be simply determined by computing a ratio between an average profile change at the bumped actuator and neighboring actuators, and the bumped actuator setpoint change.

However, for some web forming processes, such as heavy weight producing machines with slow throughput rates, the bumping of a single isolated actuator does not produce a significant enough profile response to accurately model the CD process response gain. Increasing the step size of the bump actuator setpoint to achieve a more significant profile response is not always an available solution, for example where the actuator movement is limited by high or low setpoint limits, or is limited by 1st or $2^{nd}$ difference constraints.

Figure 3:
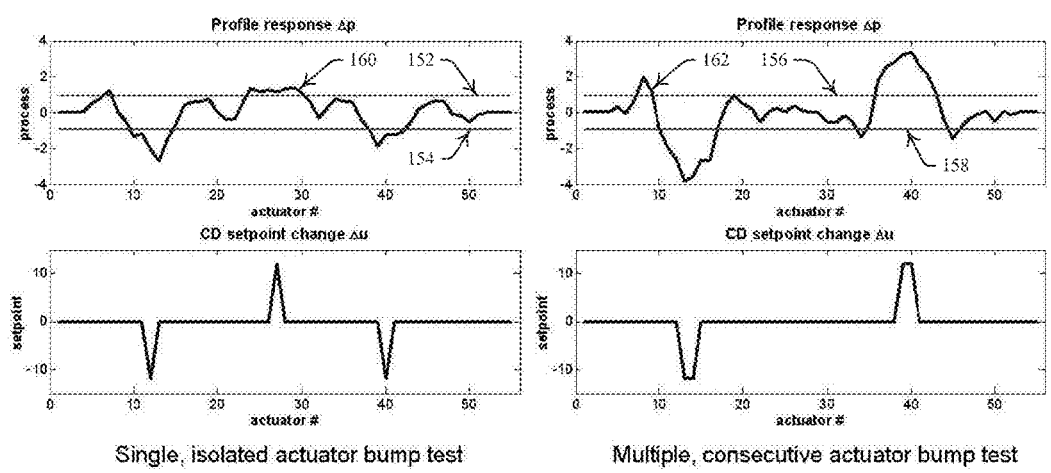
FIG. 3 is a graphical illustration of profile responses resulting from bumping single isolated actuators, and multiple consecutive actuators.

Accordingly, embodiments of the present invention provide a modeling method for decomposing the collective profile response that results from the simultaneous bumping of multiple consecutive actuator setpoints. FIG. 3 graphically illustrates the significance of the profile response resulting from bumping single isolated actuators and multiple consecutive actuators. The areas between upper horizontal lines 152 and 156, and the lower horizontal lines 154 and 158 drawn on the single bump and multiple bump profile response plots, respectively, represent steady-state noise bands in the respective profile measurements. In the single isolated actuator bump test the peak values of the plotted profile response 160 is insignificant compared to the steady-state noise band, whereas the bumping multiple consecutive CD actuators instead produces a response profile 162 that is readily distinguished from the noise band.

However, while the bumping of multiple consecutive actuators may be a good way of producing a significant profile response, this presents challenges in decomposing the additive responses into meaningful data in order to determine the CD response model of a singular actuator zone. Moreover, a profile response model that is not accurately specified may result in over-control, sluggish control or a CD actuator setpoint solution that induces instead of minimizing variations in the controlled profile measurement.

Figure 4:
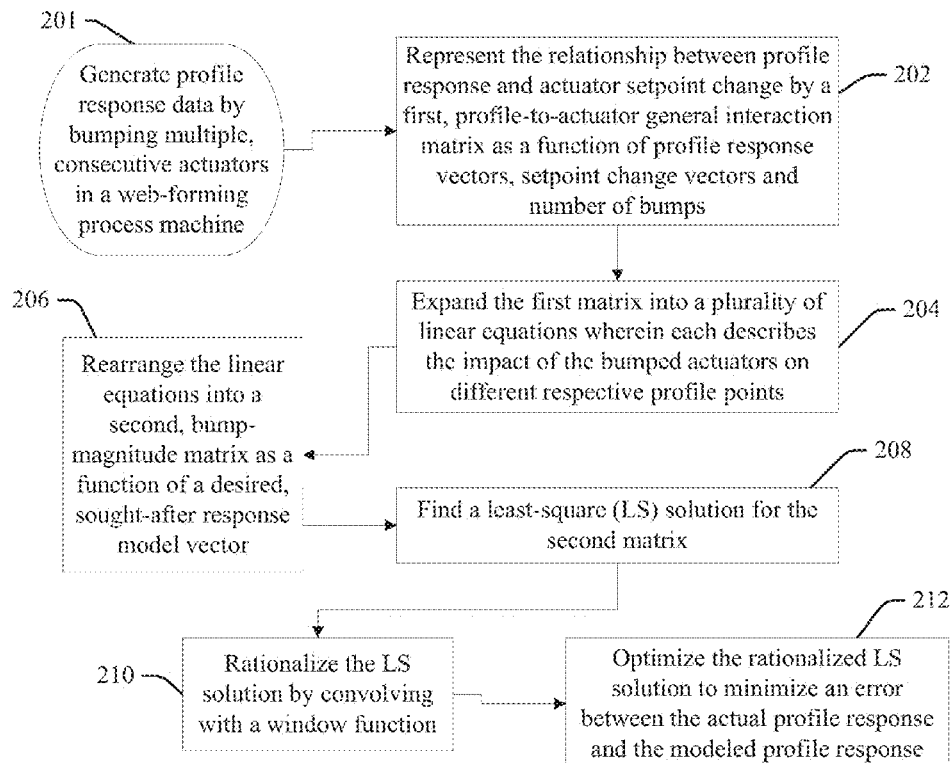
FIG. 4 is a block diagram illustration of a system, process or method according to the present invention for modeling the response of a multiple consecutive actuator bump test.

FIG. 4 is a block diagram illustration of a system, process or method according to the embodiment of FIG. 1 for modeling the response of a multiple consecutive actuator bump test. At 201 profile response data is generated by consecutively bumping each of a plurality of actuators in a machine of a web-forming process. At 202 the relationship between a profile response and an actuator setpoint change is represented by a first, profile-to-actuator general interaction matrix as a function of observed profile response vectors and setpoint change vectors derived from the data 201, and a total number of the actuators used to generate the profile response data. At 204 this first, general interaction matrix is expanded into a plurality of linear equations wherein each describes the impact of the bumped actuators on each of different respective profile points of the generated profile response data.

At 206 the plurality of linear equations are rearranged into a second, bump-magnitude matrix as a function of a desired, sought-after response model vector. At 208 a least-square (LS) solution is found for the second matrix. At 210 the LS solution is convolved with a window function, thereby filtering or rationalizing the LS solution. At 212 the rationalized LS solution is optimized to minimize an error between the actual profile response and the modeled profile response.

Figure 5:
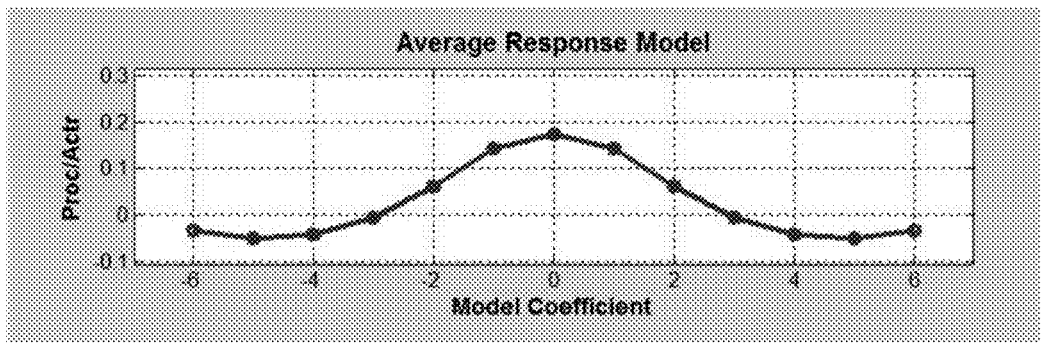
FIG. 5 is a graphical illustration of an average response model of a singular actuator profile response identified from bumping three consecutive actuators.
Figure 6:
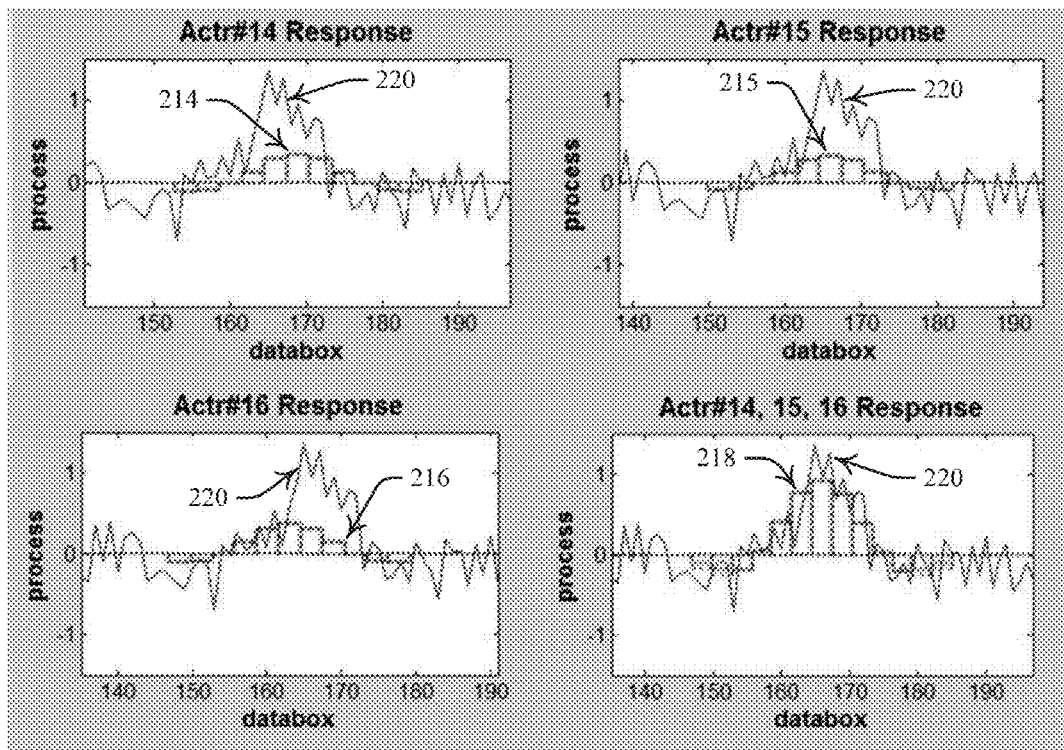
FIG. 6 provides graphical illustrations of singular and combined or superimposed actuator profile response, shown in contrast to a total profile response, with respect to the model of FIG. 5.
Figure 7:
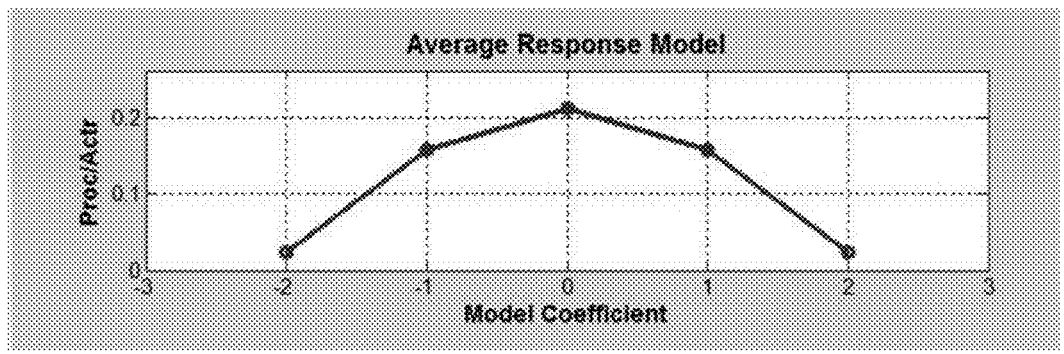
FIG. 7 is a graphical illustration of another three actuator coefficient response model with no negative side lobes.
Figures 8, 9:
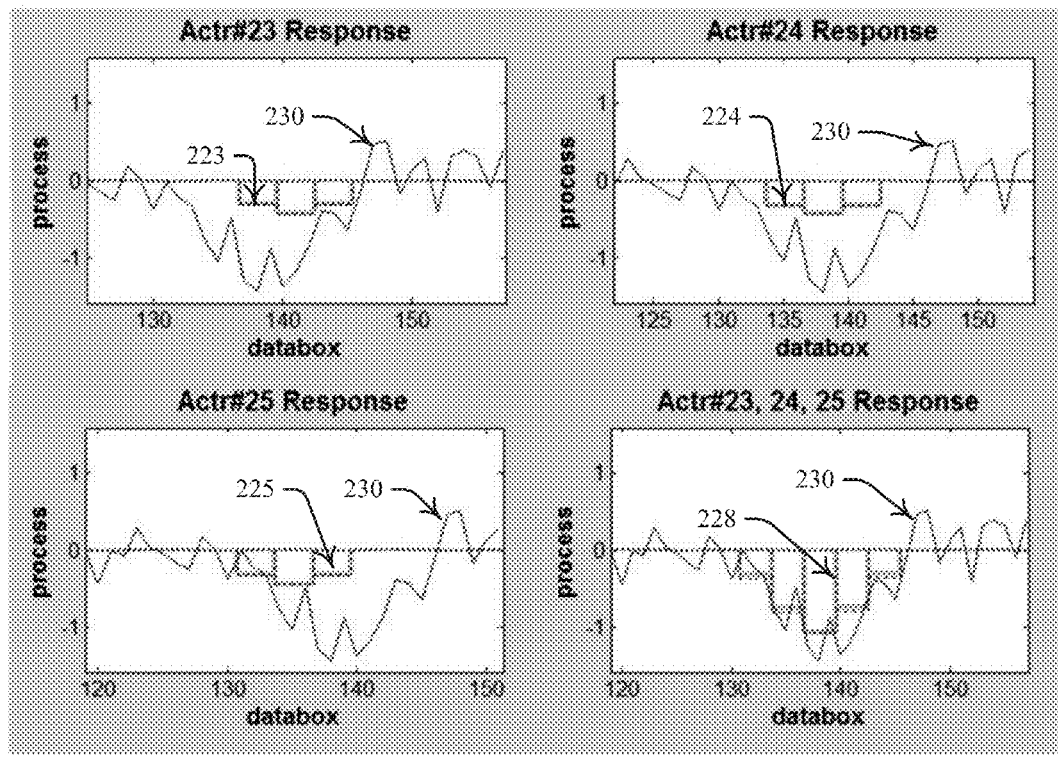
FIG. 8 provides graphical illustrations of singular and combined or superimposed actuator profile response, shown in contrast to a total profile response, with respect to the model of FIG. 7.
FIG. 9 is a graphical illustration of a general interaction matrix defined by embodiments of the present invention.

A basic premise of CD control provides that a CD response model is symmetric and can be modeled as a linear system. As a linear system, this means that a superposition principle is applicable, which also means that the total profile response may be equal to the sum of the profile response that would have been caused by changing the setpoint of each CD actuator individually. More particularly, FIG. 5 illustrates an average response model of a singular actuator profile response identified from bumping three consecutive actuators, wherein FIG. 6 illustrates singular actuator profile responses 214, 215 and 216 for each of the three actuators (identified respectively as actuators number 14, 15 and 16) shown in contrast to a total profile response 220 produced by bumping the three consecutive actuators at the same time, and wherein 218 is the combined or superimposed profile response for the actuators. FIG. 7 illustrates another three actuator coefficient response model with no negative side lobes, wherein FIG. 8 illustrates singular actuator profile responses 223, 224 and 225 for each of three other actuators (identified respectively as actuators number 23, 24 and 25) and shown in contrast to a total profile response 230 produced by bumping the three consecutive actuators at the same time. A combined or superimposed profile response 228 for the actuators 23 through 25 is also illustrated.

In one embodiment the general relationship between the profile response and actuator setpoint change can be represented at 202 (FIG. 4) by defining the first general interaction matrix by the expression $\{\Delta p = G\,\Delta u\}$ as illustrated in FIG. 9, where $\{n\}$ is the total number of CD actuators in the profiling equipment, $\{\Delta p\}$ is an $\{n \times 1\}$ (n-by-one) profile response vector, $\{G\}$ is an $\{n \times n\}$ matrix representing a profile-to-actuator interaction matrix, and $\{\Delta u\}$ is a $\{n \times 1\}$ setpoint change vector, with $\{\Delta u(a)\}$ 306 and $\{\Delta u(b)\}$ 308 representing different bumped actuators.

Since the $\{G\}$ matrix is the interaction matrix between the actuator setpoint and the profile response, the sought after CD response model is embedded along the main band diagonal of the $\{G\}$ matrix. While the design of an actual CD control system may produce profile measurement at a high resolution (or higher vector dimension) than the number of actuators, the derivation in embodiments of the present invention generally assume that the profile measurement is appropriately down-sampled (mapped down) so that a common dimension defined by the total number $\{n\}$ of CD actuators in the profiling equipment exists for the above vectors and matrix.

In the present embodiment, expanding the first, general interaction matrix at 204 comprises writing out the first matrix expression $\{\Delta p = G\,\Delta u\}$ to show constituent row-column elements further expanded into a system of $\{n\}$ linear equations. Only the products involving the two middle columns 302 and 304, representing the multiple consecutive actuator zones that are bumped $\{u(a)\}$ and $\{u(b)\}$ respectively, are of interest; all other columns of the matrix are multiplied by the expression $\{u_j=0\}$ to result in a zero profile responses.

The $\{G\}$ matrix is square, and the sought after response model is made up of elements symmetric about a main diagonal 310. The $\{g(ij)\}$ elements within the $\{G\}$ matrix are coefficients of the response model, which may also be defined with respect to a response gain expression $\{K_p\}$ that relates changes in the measurement profile to changes in a CD actuator setpoint. More particularly, the coefficients of the $\{G\}$ matrix relate to the response model of a given CD actuator $\{k\}$ according to the following expressions:

Primary model coefficient: $K_p(1) = g(i,j) = \Delta p(k)/\Delta u(k)$, for $k=i=j$;

Secondary model coefficient: $K_p(2) = g(i-1,j) = g(i+1,j) = \text{mean}[\Delta p(k-1), \Delta p(k+1)]/\Delta u(k)$, for $k=i=j$; and High order model coefficient: $K_p(h) = g(i-h+1,j) = g(i+h-1,j) = \text{mean}[\Delta p(k-h+1), \Delta p(k+h-1)]/\Delta u(k)$, for $k=i=j$.

In the present embodiment rearranging these linear equations into a second, bump-magnitude matrix at 206 comprises rewriting them into a matrix of the form $\{Ax=y\}$, where $\{x\}$ is the sought after response model vector and $\{A\}$ and $\{y\}$ represent a matrix and vector, respectively, of known values, according to the following expressions for each of the $\{n\}$ bumped actuators:

$\Delta p(1) = g(1,a)(\Delta u(a)) + g(1,b)(\Delta u(b)); \ldots \Delta p(i) = g(i,a)(\Delta u(a)) + g(i,b)(\Delta u(b)); \ldots \Delta p(n) = g(n,a)(\Delta u(a)) + g(n,b)(\Delta u(b))$.

The above expressions may also be represented by:

$\{\underline{\Delta p} = A_{ua}\underline{g} + A_{ub}\underline{g}\}$, where $\{\underline{\Delta p}\}$ is a response vector profile; $\{A_{ua}\}$ is a square matrix containing bump magnitude $\{u(a)\}$ along a predictable zigzag band; $\{A_{ub}\}$ is a square matrix containing bump magnitude $\{u(b)\}$ along a predictable zigzag band; and $\{\underline{g}\}$ is a response model vector according to expression:

$\{[K_p(1) \ldots K_p(n)]^T\}$.

Since the $\{\underline{g}\}$ vector is common and the $\{A_{uk}\}$ matrices have the same dimension, the expression:

$\{\underline{\Delta p} = A_{ua}\underline{g} + A_{ub}\underline{g}\}$ can be simplified to $\{\underline{\Delta p} = A\underline{g}\}$, where $\{A = A_{ua} + A_{ub}\}$; this may be further expressed in the form $\{\underline{y} = A\underline{x}\}$, where $\{\underline{y} = \underline{\Delta p}\}$ and $\{\underline{x} = \underline{g}\}$.

While this formulation example makes reference to the bumping of two consecutive actuator zones {a} and {b} by setpoint change magnitudes {Δu(a)} and {Δu(b)}, the present embodiment can be extended to the bumping of higher number of consecutive actuator zones, like consecutive zones {a}, {b}, {c}, {d}, etc.

Figures 10, 11:
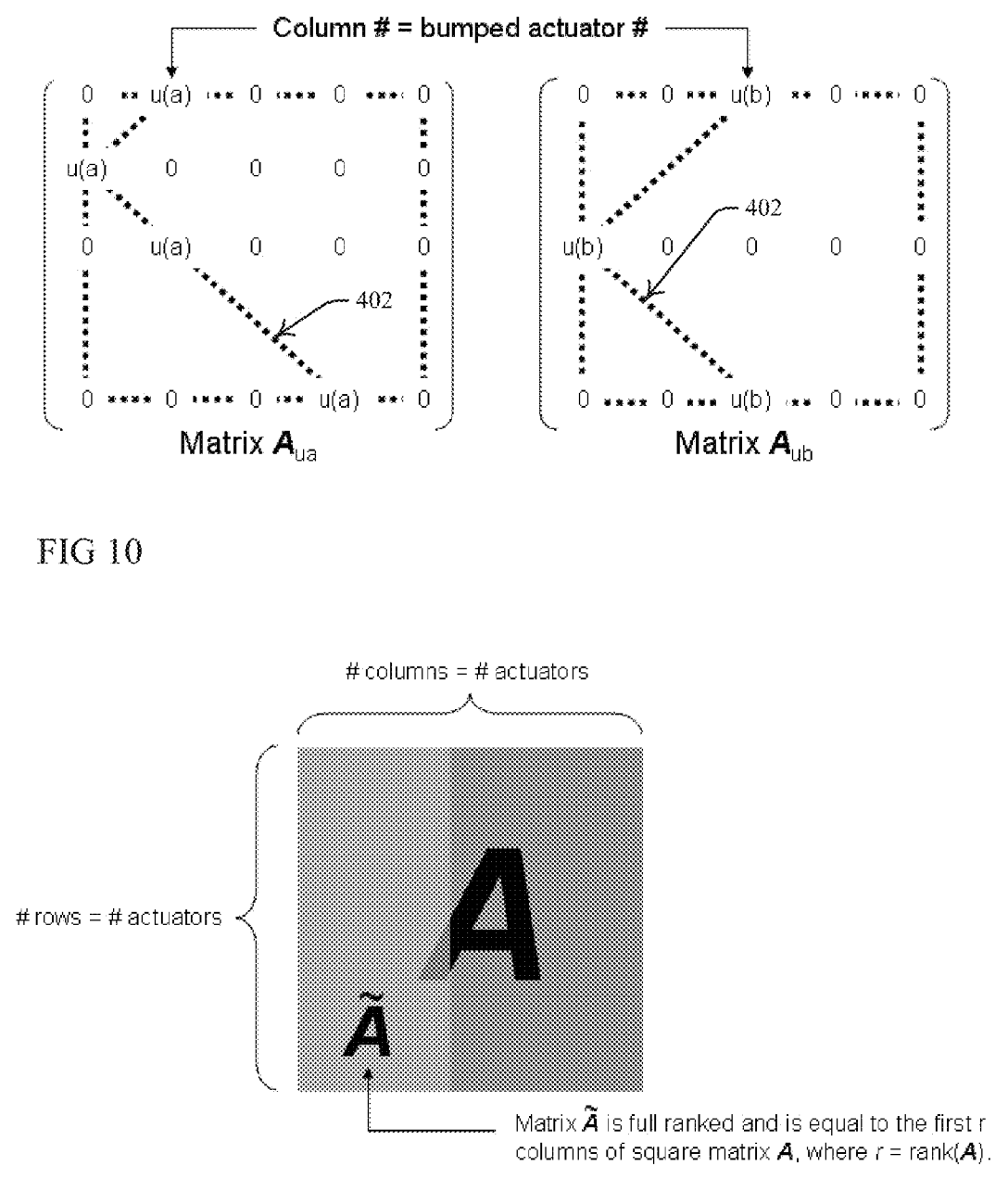

Matrices $\{A_{ua}\}$ and $\{A_{ub}\}$ contain the corresponding bump magnitude along the zigzag lines 402 illustrated in FIG. 10, and zero elsewhere. The non-zero value in these matrices begins in row 1 at the column number corresponding to the bumped actuator number, and appear in subsequent rows at the next column number, shifting first to the left then to the right when column 1 is reached.

While the second matrix equation may be expressed as {y=Ax} as discussed above, the value of {x} (or g) cannot be solved by multiplying both sides of the equation by the inverse of the square matrix A, because the square matrix A is not full ranked. In other words, not all of the linear equations are independent, so the system of equations is over-determined and a unique solution does not exist for {x}. For over-determined systems, the solution of {x} can be approximated as a least squares solution $\{x_{lsq}\}$ (thus, finding the LS solution of the second matrix at 208). This is computed by pre-multiplying vector {y} by the pseudo-inverse of {A} via redefining the expression {y=Ax} with a fully ranked matrix {Ã}, and thus as $\{y=\tilde{A}x_{lsq}\}$, wherein the fully ranked matrix {Ã} is equal to the first {r} columns of {A} where {r} is the rank of {A}, as graphically illustrated in FIG. 11. The expression $\{y=\tilde{A}x_{lsq}\}$ my be further defined as:

$$\{x_{lsq}=((\tilde{A}^T\tilde{A})^{-1}\tilde{A}^T)y\}.$$

Figure 12:
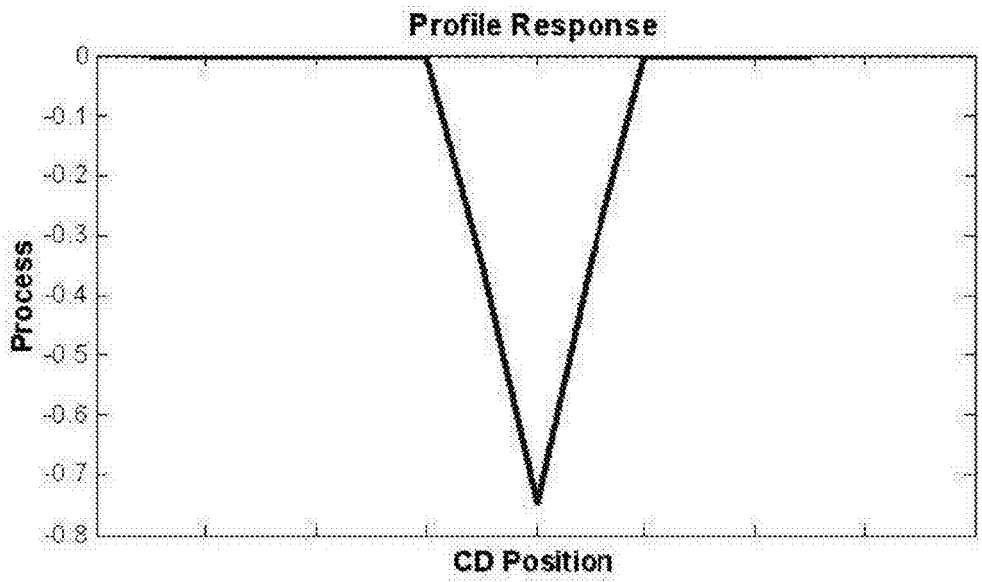
FIG. 12 is a graphical illustration of a profile response in a web-forming process according to the present invention.
Figure 13:
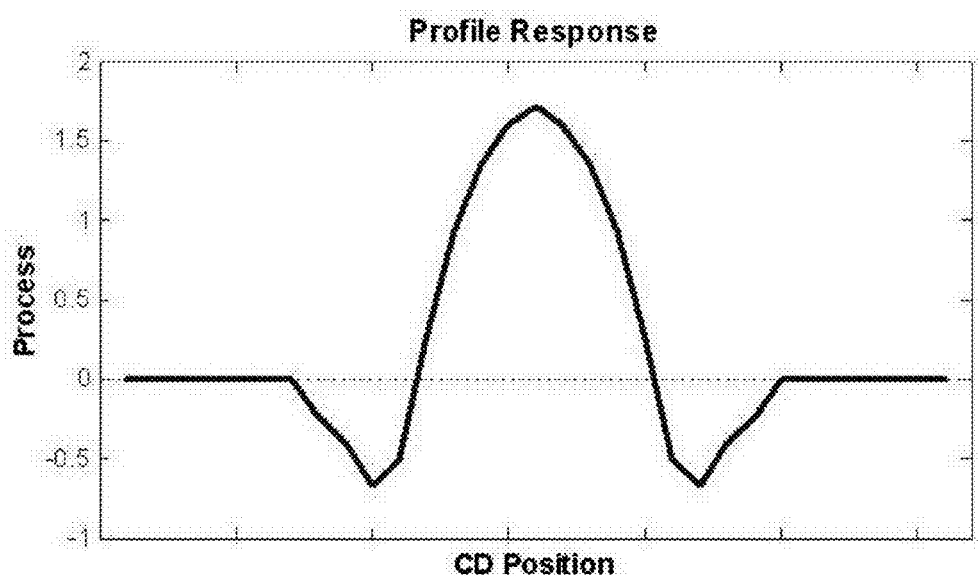
FIG. 13 is a graphical illustration of a profile response in a web-forming process according to the present invention.

Web forming profile control may be achieved by manipulating a variety of profiling actuator systems. With respect to rationalizing the LS solution of the CD Response Model at 210, the choice of profiling actuator system manipulated is dependent on the control application. For a weight profile control, this is usually achieved by deforming a flexible member such as the slice lip or coating blade or regulating the dilution flow valves (as discussed with respect to 124, FIG. 1). For moisture profile control, this is usually achieved by regulating the water or steam valves 126, or energy output from the infrared source 128. For caliper profile control, this is usually achieved by regulating the amount of inductive heating or thermal heating on the calendar roll 130. In such applications, the physical realizable profile response to output from a single actuator is smooth, with either one main response lobe, or a main response lobe with side lobes. The latter is the typical response from deforming a flexible member, like a paper machine headbox slice 120. FIGS. 12 and 13 illustrate exemplary profile responses for a dilution control headbox and slice control headbox, respectively.

The least square solution $\{x_{lsq}\}$ will be non-smooth, because it approximates an over-determined system and is subject to residual noise in the response profile {Δp} (or Δy). To make the least square solution resemble a physically realizable profile response, embodiments of the present invention filter the least square solution by convolving it (at 210 of FIG. 4) with a window function {w[n]}, such as a Blackman, Hann or a Hamming window function, to generate a filtered response model $\{x_{flt}\}$ according to the expression:

$$\{x_{flt}[n]=(x_{lsq}*w)[n]\}.$$

Figure 14:
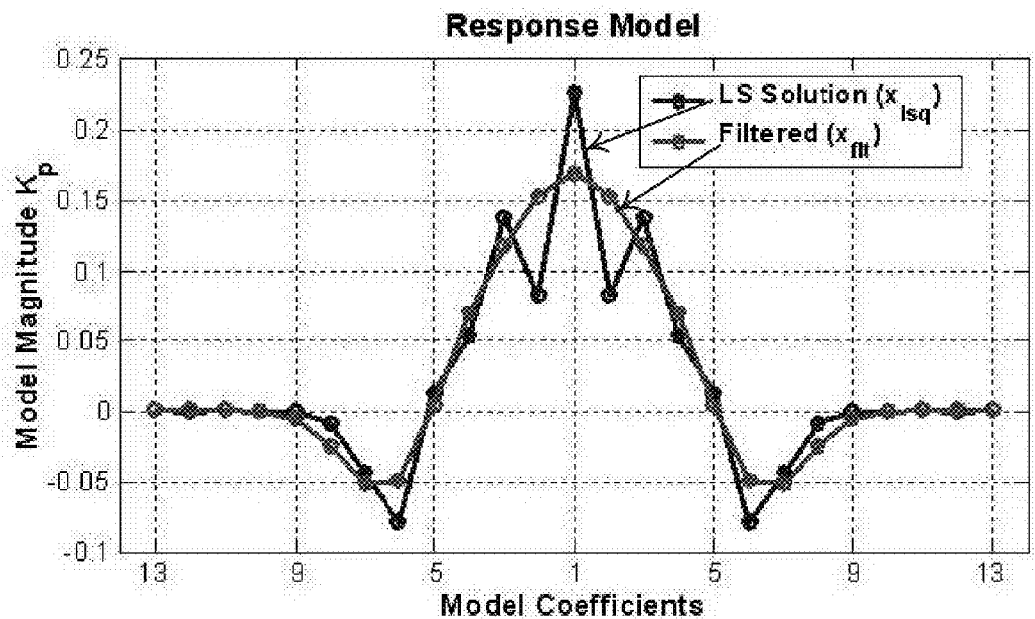
FIG. 14 is a graphical illustration of a least square solution and a filtered response model according to the present invention, of the profile response of FIG. 13.

FIG. 14 illustrates a least square solution and a filtered response model of the slice control headbox response profile of FIG. 13. The coefficients of the window function may be defined by a formula and a specified window size {N}, and wherein the window size is selected to be less than the zero crossing width of the profile response model. A window size [N] that is too large will increase the zero crossing width of the filtered response model $\{x_{flt}\}$.

Figure 15:
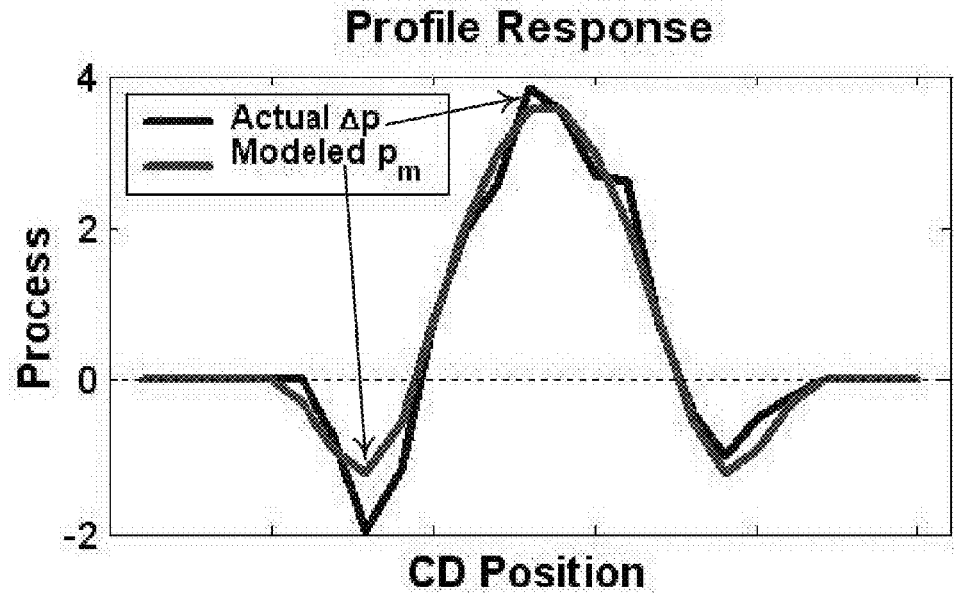
FIG. 15 is a graphical illustration of a modeled response.

Filtering the least square solution is a necessary step to rationalize the profile response model. However, filtering affects the magnitude of the response model $\{x_{flt}\}$, and therefore introduces error between the actual profile response {Δp} and a modeled response {p̃} defined by the following expression: $\{\tilde{p}=\tilde{G}\Delta u\}$, where the {G̃} matrix is constructed from the identified response model. The actual profile response {Δp} and the modeled response {p̃, or "$p_m$"} for the profile of FIGS. 13 and 14 are depicted in FIG. 15.

To correct for the effects of filtering, the filtered response model is optimized at 212 to minimize the error between the actual profile response and the modeled response. The profile response may be divided into positive and negative constituents to correspond to the positive and negative lobes in the response model, wherein the positive lobe may be optimized to minimize the positive error constituent, and the negative lobe separately optimized to minimize the negative error constituent.

In one embodiment of the present invention the positive error constituent is defined and optimized according to the following expressions:

$$\{e_+=(\Delta \underline{p}_+ - \tilde{\underline{p}}_+)/\Delta \underline{p}_+\};$$

$$\{x_{opt+}(k)=\arg\min_{x_{opt}(k)}\{e+\}\}; \text{ and}$$

$$\{x_{opt+}(k)=x_{opt+}(k-1)(1+e_+);$$

wherein the "+" symbol signifies positive values in the vectors {e, Δp, p̃, $x_{opt}$}.

Similarly, the negative error constituent is defined and optimized according to the following expressions:

$$\{e_-=(\Delta \underline{p}_- - \tilde{\underline{p}}_-)/\Delta \underline{p}_-\};$$

$$\{x_{opt-}(k)=\arg\min_{x_{opt}(k)}\{e-\}\}; \text{ and}$$

$$\{x_{opt-}(k)=x_{opt-}(k-1)(1+e_-);$$

where the "−" symbol signifies negative values in the vectors {e, Δp, p̃, $x_{opt}$}.

Figure 16:
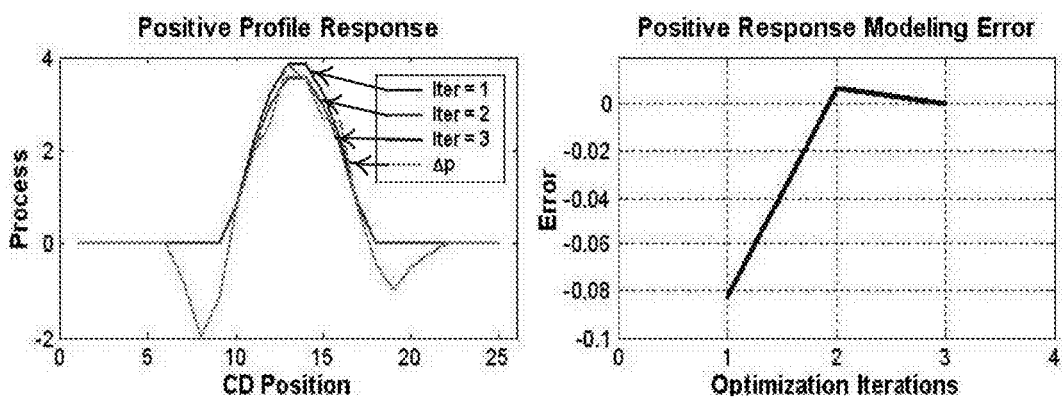
FIG. 16 is a graphical illustration of a positive profile response iteratively optimized.
Figure 17:
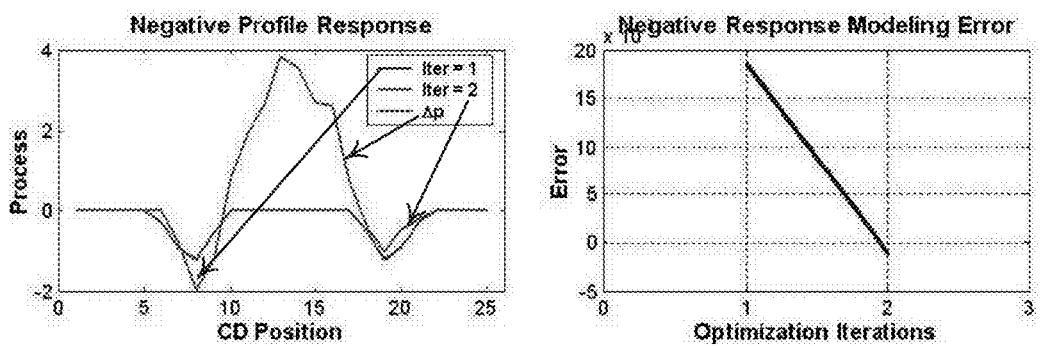
FIG. 17 is a graphical illustration of a negative profile response iteratively optimized.
Figure 18:
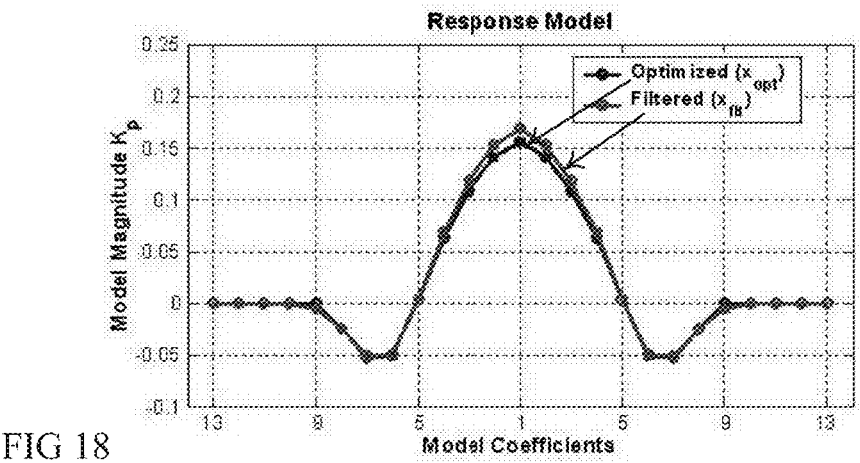
FIG. 18 is a graphical illustration of optimized and filtered profiles.

FIG. 16 illustrates one example wherein the positive profile response for the profile of FIGS. 13-15 is iteratively optimized over three iterations, labeled as "Iter=1", "Iter=2" and "Iter=3", respectively, with the third iteration reducing the positive response modeling error to zero. FIG. 17 illustrates optimization of the negative profile response for the profile of FIGS. 13-15 over two iterations "Iter=1" and "Iter=2," with the second iteration reducing the negative response modeling error to zero. FIG. 18 illustrates the resultant optimized and filtered profiles of the profiles of FIGS. 13-15.

The testing and modeling methods of embodiments of the present invention allow accurate identification of the profile response on machines that have insignificant response from bumping just single, isolated actuators. When employed on such machines, these embodiments enable the identification of response models that were different from those actively used in the control system, resulting in improved CD control performance. While the present embodiments have been described with respect to handling multiple, consecutive actuator bump tests, the modeling embodiments may also be employed to accurately identify profile response models from single, isolated actuator bump tests. Moreover, some embodiments may model bump tests wherein multiple, consecutive actuators are moved by different magnitudes, and in different directions, for example positive versus negative.

As will be appreciated by one skilled in the art, aspects of embodiments the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 19:
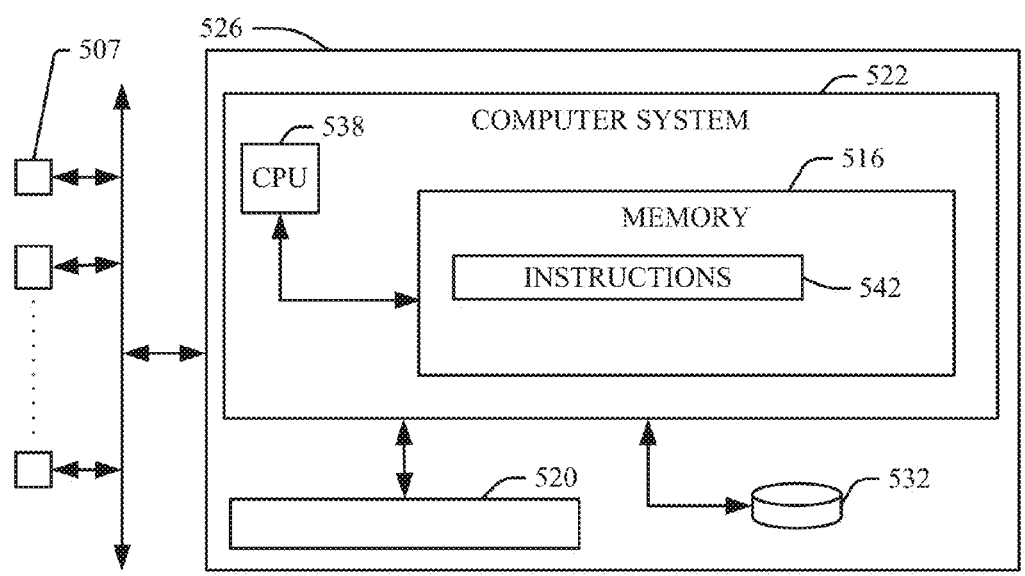
FIG. 19 is a block diagram illustration of a computerized implementation of an embodiment of the present invention.

Referring now to FIG. 19, an exemplary computerized implementation of an embodiment of the present invention includes a computer system or other programmable device 522 in communication with each of plurality of actuators 507 if a machine within a web-forming process. Instructions 542 reside within computer readable code in a computer readable memory 516, or in a computer readable storage system 532 or other tangible computer readable storage medium that is accessed through a computer network infrastructure 526 by a processing unit (CPU) 538. Thus, the instructions, when implemented by the processing unit (CPU) 538, cause the processing unit (CPU) 538 to provide feedback control that causes a cross-direction actuator 520 to adjust the plurality of actuators 507 to maintain the actual profile response of a product of the web-forming process within a specified profile property, as discussed above with respect to FIGS. 1-18.

Embodiments of the present invention may also perform process steps of the invention on a subscription, advertising, and/or fee basis. That is, a service provider could offer to integrate computer-readable program code into the computer system 522 to enable the computer system 522 to provide feedback control that causes a cross-direction actuator 520 to adjust the plurality of actuators 507 to maintain the actual profile response of a product of the web-forming process within a specified profile property, as discussed above with respect to FIGS. 1-19. The service provider can create, maintain, and support, etc., a computer infrastructure such as the computer system 522, network environment 526, or parts thereof, that perform the process steps of the invention for one or more customers. In return, the service provider can receive payment from the customer(s) under a subscription and/or fee agreement. Services may comprise one or more of: (1) installing program code on a computing device, such as the computer device 522, from a tangible computer-readable medium 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g., a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for modeling the response of a multiple consecutive actuator bump test, wherein a processor is coupled to a memory, the method comprising executing on the processor the steps of:

generating profile response data by consecutively bumping each of a plurality of actuators in a machine of a web-forming process;

representing a relationship between the generated profile response data and an actuator setpoint change in the generated profile response data by a profile-to-actuator general interaction matrix;

expanding the profile-to-actuator general interaction matrix to show constituent row-column elements as a plurality of linear equations that each describe an impact of the bumped actuators on each of different respective profile points of the generated profile response data;

rearranging, as a function of a desired response model vector, the plurality of linear equations into a bump-magnitude matrix that comprises zero profile responses in constituent row-column elements of each of first and last columns that do not represent multiple consecutively bumped actuator zones, and products of respective multiple consecutive actuator zones that are bumped within constituent row-column elements of at least two middle columns;

finding a least-square solution for the bump-magnitude matrix;

convolving the least-square solution with a window function; and optimizing the convolved least-square solution to minimize an error between the generated profile response data and a modeled profile response by:

dividing the generated profile response data into a positive constituent that corresponds to a positive lobe in the modeled profile response, and a negative constituent that corresponds to a negative lobe in the modeled profile response;

optimizing the positive lobe to minimize the positive error constituent; and optimizing the negative lobe to minimize the negative error constituent.

2. The method of claim 1, further comprising representing the relationship between the generated profile response data and the actuator setpoint change in the profile-to-actuator general interaction matrix as a function of observing profile response vectors in the generated profile response data, setpoint change vectors derived from the generated profile response data, and a total number of the actuators used to generate the profile response data.

3. The method of claim 1, wherein the step of representing the relationship between the generated profile response data and the actuator setpoint change in the profile-to-actuator general interaction matrix further comprises zeroing out profile responses in constituent row-column elements of the matrix that do not represent multiple consecutively bumped actuator zones.

4. The method of claim 1, wherein the step of convolving the least-square solution with the window function further comprises defining the window function as a function of a specified window size that is selected to be less than a zero crossing width of the modeled profile response.

5. The method of claim 1, wherein at least one of the steps of optimizing the positive lobe to minimize the positive error constituent, and optimizing the negative lobe to minimize the negative error constituent, further comprises iteratively optimizing until the error constituent is reduced to zero.

6. A system, comprising:

a cross-direction feedback controller in communication with a cross-direction profiler system and an actuator setpoint controller;

wherein the cross-direction feedback controller and the actuator setpoint controller are each in communication with a plurality of actuators in a machine of a web-forming process, and with a local region detector that determines a profile response of a product of the web-forming process in response to consecutively bumping each of the plurality of actuators; and wherein the cross-direction feedback controller provides feedback control that causes a cross-direction actuator to adjust the plurality of actuators to maintain generated profile response data of a product of the web-forming process within a specified profile property by:

representing a relationship between profile response data generated by consecutively bumping each of the plurality of actuators and an actuator setpoint change in the generated profile response data by a profile-to-actuator general interaction matrix;

expanding the profile-to-actuator general interaction matrix to show constituent row-column elements as a plurality of linear equations that each describe an impact of the bumped actuators on each of different respective profile points of the generated profile response data;

rearranging, as a function of a desired response model vector, the plurality of linear equations into a bump-magnitude matrix that comprises zero profile responses in constituent row-column elements of each of first and last columns that do not represent multiple consecutively bumped actuator zones, and products of respective multiple consecutive actuator zones that are bumped within constituent row-column elements of at least two middle columns;

finding a least-square solution for the bump-magnitude matrix;

convolving the least-square solution with a window function; and optimizing the convolved least-square solution to minimize an error between the generated profile response data and a modeled profile response by:

dividing the generated profile response data into a positive constituent that corresponds to a positive lobe in the modeled profile response, and a negative constituent that corresponds to a negative lobe in the modeled profile response;

optimizing the positive lobe to minimize the positive error constituent; and optimizing the negative lobe to minimize the negative error constituent.

7. The system of claim 6, wherein the cross-direction feedback controller represents the relationship between the generated profile response data and the actuator setpoint change in the profile-to-actuator general interaction matrix as a function of observing profile response vectors in the generated profile response data, setpoint change vectors derived from the generated profile response data, and a total number of the actuators used to generate the profile response data.

8. The system of claim 6, wherein the cross-direction feedback controller represents the relationship between the generated profile response data and the actuator setpoint change in the profile-to-actuator general interaction matrix by zeroing out profile responses in constituent row-column elements of the matrix that do not represent multiple consecutively bumped actuator zones.

9. The system of claim 6, wherein the cross-direction feedback controller convolves the least-square solution with the window function by defining the window function as a function of a specified window size that is selected to be less than a zero crossing width of the modeled profile response.

10. The system of claim 6, wherein the cross-direction feedback controller optimizes the positive lobe to minimize the positive error constituent, or the negative lobe to minimize the negative error constituent, by iteratively optimizing until the error constituent is reduced to zero.

11. An article of manufacture, comprising:

a computer readable hardware storage device having computer readable program code embodied therewith, the computer readable program code comprising instructions for execution by a computer processing unit, that cause the computer processing unit to:

represent a relationship between profile response data generated by consecutively bumping each of a plurality of actuators in a machine of a web-forming process and an actuator setpoint change in the generated profile response data by a profile-to-actuator general interaction matrix;

expand the profile-to-actuator general interaction matrix to show constituent row-column elements as a plurality of linear equations that each describe an impact of the bumped actuators on each of different respective profile points of the generated profile response data;

rearrange, as a function of a desired response model vector, the plurality of linear equations into a bump-magnitude matrix that comprises zero profile responses in constituent row-column elements of each of first and last columns that do not represent multiple consecutively bumped actuator zones, and products of respective multiple consecutive actuator zones that are bumped within constituent row-column elements of at least two middle columns;

find a least-square solution for the bump-magnitude matrix;

convolve the least-square solution with a window function; and optimize the convolved least-square solution to minimize an error between the generated actual profile response data and a modeled profile response by:

dividing the generated profile response data into a positive constituent that corresponds to a positive lobe in the modeled profile response, and a negative constituent that corresponds to a negative lobe in the modeled profile response;

optimizing the positive lobe to minimize the positive error constituent; and optimizing the negative lobe to minimize the negative error constituent.

12. The article of manufacture of claim 11, wherein the computer readable program code instructions for execution by the computer processing unit, further cause the computer processing unit to represent the relationship between the generated profile response data and the actuator setpoint change in the profile-to-actuator general interaction matrix as a function of observing profile response vectors in the generated profile response data, setpoint change vectors derived from the generated profile response data, and a total number of the actuators used to generate the profile response data.

13. The article of manufacture of claim 11, wherein the computer readable program code instructions for execution by the computer processing unit, further cause the computer processing unit to represent the relationship between the generated profile response data and the actuator setpoint change in the profile-to-actuator general interaction matrix by zeroing out profile responses in constituent row-column elements of the matrix that do not represent multiple consecutively bumped actuator zones.

14. The article of manufacture of claim 11, wherein the computer readable program code instructions for execution by the computer processing unit, further cause the computer processing unit to convolve the least-square solution with the window function by defining the window function as a function of a specified window size that is selected to be less than a zero crossing width of the modeled profile response.

15. The article of manufacture of claim 11, wherein the computer readable program code instructions for execution by the computer processing unit, further cause the computer processing unit to optimize the positive lobe to minimize the positive error constituent, or the negative lobe to minimize the negative error constituent, by iteratively optimizing until the error constituent is reduced to zero.

* * * * *